United States Patent [19]

Kataoka et al.

[11] Patent Number: 4,468,374

[45] Date of Patent: Aug. 28, 1984

[54] METHOD FOR RECOVERY OF GALLIUM

[75] Inventors: Yushin Kataoka; Masaaki Matsuda, both of Niihama; Hiroshi Yoshitake, Ibaraki; Yoshikazu Hirose, Toyonaka, all of Japan

[73] Assignee: Simitomo Chemical Company, Limited, Osaka, Japan

[21] Appl. No.: 416,692

[22] Filed: Sep. 10, 1982

[30] Foreign Application Priority Data

Sep. 17, 1981 [JP] Japan ............................. 56-147229
Sep. 19, 1981 [JP] Japan ............................. 56-148444

[51] Int. Cl.$^3$ .......................................... C01G 15/00
[52] U.S. Cl. ............................ 423/112; 75/101 BE
[58] Field of Search ..................... 423/112, DIG. 14; 75/101 BE

[56] References Cited

U.S. PATENT DOCUMENTS

| 3,971,843 | 7/1976 | Helgorsky et al. |
| 4,169,130 | 9/1979 | Helgorsky et al. |
| 4,241,029 | 12/1980 | Helgorski et al. |

FOREIGN PATENT DOCUMENTS

| 54461 | 6/1982 | European Pat. Off. |
| 1194829 | 6/1965 | Fed. Rep. of Germany ...... 423/112 |
| 3011393 | 1/1981 | Fed. Rep. of Germany ... 423/DIG. 14 |
| 39-11354 | 6/1964 | Japan ................................. 423/112 |
| 53-103998 | 9/1978 | Japan ................................. 423/112 |
| 991614 | 5/1965 | United Kingdom ............... 423/112 |
| 1593289 | 7/1981 | United Kingdom . |

OTHER PUBLICATIONS

Chem. Abst., vol. 79, Abst. 33975f, (1973).

Primary Examiner—Herbert T. Carter
Attorney, Agent, or Firm—Cushman, Darby & Cushman

[57] ABSTRACT

Gallium contained in a solution, especially a strongly basic aqueous solution can be effectively recovered by contacting the solution with a chelate resin having (A) =NOH group and (B) functional group capable of forming a chelate bond with said functional group (A) through gallium or a chelate resin having metal salt of said functional group to adsorb gallium to the resin.

8 Claims, No Drawings

METHOD FOR RECOVERY OF GALLIUM

This invention relates to a process for recovery of gallium from solutions containing gallium. More particularly, it relates to a process for recovery of gallium contained in solutions by adsorption with special chelate resins.

Gallium is commercially produced from Bayer solution from production of alumina, namely, aqueous sodium aluminate solution. The Bayer solution is a very useful raw material because it contains about 10–500 mg/l of gallium. Hitherto, there are two methods for recovering gallium from aqueous sodium aluminate solution, namely, one method which comprises electrolyzing the solution using mercury cathode to convert gallium in the solution into an amalgam, hydrolyzing this amalgam with a caustic alkali and then electrolyzing the resultant aqueous alkali gallate solution and another method which comprises blowing carbon dioxide into an aqueous sodium aluminate solution to precipitate mainly alumina contained in the aqueous sodium aluminate solution, blowing carbon dioxide into the solution in which the ratio of the gallium content to alumina content has been thus increased to coprecipitate alumina and gallium, dissolving the coprecipitate in a caustic alkali and then electrolyzing the resultant aqueous alkali gallate solution.

However, the former method has the defect that a large amount of mercury is lost at the amalgamation because it is dissolved in the aqueous sodium aluminate solution and the latter method also has the defect that use of carbon dioxide results in loss of caustic alkali in the aqueous sodium aluminate solution due to carbonation. Thus, these methods are industrially not satisfactory.

Recently, there are proposed some methods for recovering gallium in the Bayer solution which comprise recovering gallium from aqueous sodium aluminate solution by liquid-liquid extraction using and extraction solvent comprising an organic solvent and an extractant consisting essentially of a water-insoluble substituted hydroxyquinolines. [See, for example, Japanese Unexamined Publications (Kokai) No. 32411/76, No. 52289/78 and No. 99726/79.] These methods also have the defects that recovery amount of gallium per agents used is industrially not sufficient, that selective adsorption of gallium is not necessarily high and that since the agents used for recovery of gallium are liquid, a considerable amount of the agents are dissolved in the aqueous sodium aluminate solution and thus they are lost.

As a result of the inventors' intensive researches in an attempt to find a method of recovery of gallium with no defects mentioned above, it has been found that chelate resins having specific functional groups adsorb gallium contained in strongly basic solutions in a high selectivity. Thus, the method of this invention has been accomplished.

This invention provides a method for recovery of gallium contained in a solution which comprises contacting a solution containing gallium with a chelate resin having, in molecule, (A) =NOH group and (B) a functional group capable of forming a chelate bond with said functional group (A) through gallium or a chelate resin having a metal salt of said functional group.

The chelate resins used in this invention may be any chelate resins which have, in molecule, (A) =NOH group and (B) a functional group capable of forming a chelate bond with said functional group (A) through gallium or have a metal salt of said functional group.

As the functional group (B), mentioned may be made of

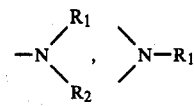

[wherein $R_1$ and $R_2$ represent hydrogen or organic group (generally alkyl group, alkylene group, phenyl group), especially alkyl group of 1–20 carbon atoms or hydrogen], $\geqslant$N, —OH, —SH, =NOH, >C=O, —NHOH, —NH—NH$_2$, —CS$_2$H, —COOH, —SO$_3$H, >C=S, —CHO, —O—, —S—, —P(OR)$_2$, —PO(OR)$_2$, —PH(OR)$_3$ (wherein R which may be identical or different represents hydrogen, phenyl group, alkyl group or amino group) and polyethylenepolyamino group. Of these groups, preferred are

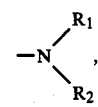

>N-R$_1$, $\geqslant$N, —OH, —CS$_2$H, >C=O, —NH—NH$_2$, polyethylenepolyamino group, =NOH, etc. Especially preferred are

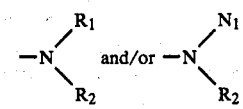

and —NHNH$_2$ and/or

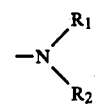

and polyethylenepolyamino group.

The chelate resins having metal salt of said functional group are those having metal salt of said functional group (A) and/or functional group (B) or metal salt formed by the chelate bond between said functional groups (A) and (B), and these chelate resins have no special limitation if the bonding power for formation of these salts is smaller than the bonding power between said functional groups (A) and (B) and gallium. Examples of the metals of said metal salts are alkali metals and alkaline earth metals such as sodium, potassium, calcium, magnesium, etc.

Examples of such chelate resins are those having amidoxime group obtained by reacting polymers of vinyl cyanide monomers such as acrylonitrile, α-chloroacrylonitrile, vinylidene cyanide, methacrylonitrile, etc. or copolymers of the vinyl cyanide monomers and other ethylenically unsaturated monomers copolymerizable therewith with hydroxylamine or derivatives of hydroxylamine; those which are obtained by homopolymerizing vinyl cyanide derivatives obtained by reacting vinyl cyanide monomers such as acrylonitrile, α-chloroacrylonitrile, vinylidene cyanide, methacrylonitrile, etc. with hydroxylamine or hydroxylamine derivatives or polymerizing said vinyl cyanide derivatives with other ethylenically unsaturated monomers copolymerizable therewith; those which are obtained by reacting polymers such as styrene-divinylbenzene copolymer, phenol resins, polyethylene, polypropyrene, polyvinyl chloride, etc. having amine reactive groups such as chloromethyl group, sulfonyl chloride group, carbonyl chloride group, isocyanate group, epoxy group, aldehyde group, etc. (these polymers are called "resins having amine reactive group" hereinafter) with nitrile compounds having amino or imino group, such as aminoacetonitrile, aminomalononitrile, diaminomaleonitrile, dicyanodiamide, iminodiacetonitrile, 1-amino-2-cyanoethane, 4-aminobenzonitrile, 1-amino-3-cyanopropane, etc. and then reacting the reaction product with hydroxylamine or hydroxylamine derivatives; those which are obtained by reacting the reaction product of said nitrile compounds having amino or imino group and hydroxylamine or hydroxylamine derivatives with said resins having amine reactive group; those which are obtained by reacting halogenated resins such as halogenated styrene-divinylbenzene copolymer, phenol resin, etc. which have sulfonic acid group, carboxylic acid group, phosphoric acid group, dithiocarboxylic acid group, alkylamino group, etc. with a reaction product of said nitrile compounds having amino or imino group and hydroxylamine or hydroxylamine derivative; those which are obtained by condensation reaction of a compound having at least one amidoxime group in molecule such as benzamidoxime, benzylamino-N-methanediamidodioxime, benzylamino-N-ethanediamidodioxime, (2-benzimidazolylthio)acetamidoxime, (2-benzimidazolylthio)ethylamidoxime, (2-benzimidazolylthio)propylamidoxime, 1,2-benzisoxazole-3-acetamidoxime, 5-fluoro-1,2-benzisoxazole-3-acetamidoxime, phenylsulfinylacetamidoxime, (3-chlorophenylsulfinyl)-acetamidoxime, etc., a mixture of these compounds or a mixture of these compounds with aniline, resorcin, 3-aminopyridine, 4-aminopyridine, 4-aminobenzenesulfonic acid or 4-aminobenzenecarboxylic acid with formaldehyde, epichlorohydrin, epibromohydrin, etc.; those which are obtained by reacting a polymer such as styrene-divinylbenzene copolymer, phenyl resin, polyethylene, polypropylene, etc. having aldehyde group or ketone group with hydroxylamine or hydroxylamine derivative; those which are obtained by reacting said resin having amine reactive group with a compound having amino or imino group and a least one =NOH group (A) in molecule such as aminoacetaldoxime, iminodiacetaldoxime, aminobenzaldoxime, aminoalkylbenzaldoxime, aminobenzhydroxamic acid, aminoalkylbenzhydroxamic acid, etc. or with a mixture of these compounds; those which are obtained by condensation reaction of formaldehyde, epichlorohydrin, epibromohydrin, etc. with a compound having at least one =NOH group (A) in molecule such as alkylaminobenzaldoxime, formylbenzaldoxime, benzaldoxime benzhydroxamic acid, alkylaminobenzaldoxime, alkylaminobenzhydroxamic acid, alkylaminomethanebenzaldoxime, alkylaminomethanebenzhydroxamic acid, alkylaminoethanebenzaldoxime, alkylaminoethanebenzhydroxamic acid, formylbenzaldoxime, formylbenzacetaldoxime, benzisoxazolacetaldoxime, benzisoxazolacetohydroxamoxime, benzisoxazolacetohydroxamic acid, phenylsulfinylacetaldoxime, alkylaminophenylsulfinylacetaldoxime, alkylaminophenylmethylsufinylacetaldoxime, alkylaminophenylcarbonylacetaldoxime, alkylaminoethylphenylcarbonylacetaldoxime, benzyldioixime, benzyloxime, benzimidazolylthioacetaldoxime, etc., a mixture of said compounds or a mixture of said compound with aniline, resorcin, 3-aminopyridine, 4-aminopyridine, 4-aminobenzenesulfonic acid, 4-aminobenzenecarboxylic acid, etc.; and salts of above said resins with alkali metals or alkaline earth metals such as sodium, potassium, calcium, magnesium, etc.

It has never been proposed to adsorb and remove gallium by a chelate resin from strongly basic gallium-containing aqueous solutions such as aqueous sodium aluminate solution from production of alumina by the Bayer process. Therefore, it has never been expected that the chelate resins according to this invention are very effective for recovery of gallium from strongly basic gallium-containing aqueous solution.

The gallium-containing solutions allowed to contact with said chelate resins in practice of the method of this invention are ordinarily strongly basic gallium-containing solutions, but other gallium-containing solutions may, of course, be used.

Especially preferred solutions to be treated according to this invention are gallium-containing aqueous sodium aluminate solutions (composition: Ga 0.01–0.5 g/l, $Al_2O_3$ 50–120 g/l and $Na_2O$ 100–200 g/l) from production of alumina by the Bayer process.

Contact of said chelate resins with solutions containing gallium according to this invention may be carried out under suitably chosen conditions. There is especially no limitation in the contacting process. Generally, the contacting is carried out by, for example, dipping the chelate resin in a gallium-containing solution or passing a gallium-containing solution through a column packed with the chelate resin. From the point of treating operations, the latter is preferred.

The amount of the chelate resin used for practice of this invention has no special limitation and varies depending on concentration of gallium in the gallium-containing solution to be treated, kinds of the chelate resins used, etc., but may be determined by optionally conducting preliminary experiments. Generally, amount of the chelate resin may be suitably chosen.

Contacting temperature of the chelate resin with the gallium-containing solution has no special limitation, but usually is 10°–100° C. Contacting time has also no special limitation and usually contacting of at least several seconds is sufficient.

Separation of gallium from the chelate resin which has adsorbed and collected gallium according to this invention may be effected by elution with hydrochloric acid, sulfuric acid, nitric acid, phosphoric acid, sodium sulfide, iminodiacetic acid, ethylenediaminetetracetic acid, etc. or by heating the resin.

The thus separated gallium can be recovered as gallium metal by known methods, e.g., by preparing sodium gallates therefrom and electrolyzing it.

As explained hereinabove, according to this invention, gallium adsorbing ability of the chelate resin is remarkably high as compared with the known gallium chelating agents and gallium equilibrium concentration can be decreased. Furthermore, the adsorbent of this invention is a resin and so gallium can be recovered by a simple operation. Thus, industrial value of this invention is high.

Moreover, the chelate resins of this invention have markedly superior selective adsorbability for gallium to the known chelating agents.

Further advantage of the chelate resins of this invention is that they are suitable for recovery of gallium especially from solutions in the Bayer process because they have alkali resistance.

The following non-limiting examples further illustrate the method of this invention.

EXAMPLE 1

10 cc of a vinylamidoxime polymer (called chelate resin 1 hereinafter) obtained by the reaction of polyacrylonitrile fiber, hydroxylamine hydrochloride and aqueous sodium hydroxide solution was packed in a column of 12 m/mφ in inner diameter. 100 cc of aqueous sodium aluminate solution from production of alumina by the Bayer process which contained 189 ppm of Ga, 42,000 ppm of Al and 123,800 ppm of Na was introduced into said column from top of the column and passed therethrough over a period of 2 hours and Ga and Al in the effluent were analyzed to obtain the results as shown in Table 1.

TABLE 1

| Item | Kinds of metals | |
|---|---|---|
| | Ga | Al |
| Concentration of metals (ppm) | 8 | 41,960 |
| Adsorption recovery (%) | 96 | 0.1 |

EXAMPLES 2–16

Chelate resin ②:
Vinylsulfonamidemethanediamidedioxime resin obtained by chlorinating vinylsulfonic acid-divinylbenzene copolymer resin in the presence of carbon tetrachloride solvent and sulfur, then reacting the chlorination product with aminomalonitrile and thereafter reacting the reaction product with hydroxylamine.

Chelate resin ③:
Vinylcarboxylic acid amideacetamidoximedivinylbenzene copolymer resin obtained by halogenating acrylic acid-divinylbenzene copolymer resin with phosgene in the presence of N,N-dimethylformamide solvent and then reacting the product with aminoacetamidoxime.

Chelate resin ④:
A resin having =NOH group, —NH₂ group and —OH group obtained by reacting benzamidoxime, resorcin and formalin.

Chelate resin ⑤:
Vinylamidoxime-divinylbenzene copolymer resin obtained by reacting acrylonitrile-divinylbenzene copolymer with hydroxylamine.

Chelate resin ⑥:
Vinyldiamidodioxime-divinylbenzene-acrylic acid copolymer resin obtained by reacting a copolymer of vinylidene cyanide, divinylbenzene and methyl acrylate with hydroxylamine.

Chelate resin ⑦:
Vinylamidoxime-acrylic acid copolymer resin obtained by copolymerizing a reaction product of acrylonitrile and hydroxylamine with ethyl acrylate and thereafter hydrolyzing the resultant copolymer.

Chelate resin ⑧:
A resin obtained by reacting chloromethylated styrenedivinylbenzene resin with diaminomaleonitrile and further reacting the resultant reaction product with hydroxylamine.

Chelate resin ⑨:
A resin obtained by chlorinating strongly basic ion exchange resin having trimethylamino group [Duolite A-161 (manufactured by Diamond Shamrock Corporation)] in the presence of 1,2-dichloro-1,2-difluoroethane solvent, then reacting this resin with iminodiacetonitrile and moreover reacting the reaction product with hydroxylamine.

Chelate resin ⑩:
A resin obtained by chlorinating styrenedivinylbenzene resin having sulfonic acid group [Duolite C-26 (manufactured by Diamond Shamrock Corporation)] with phosgene in the presence of N,N-dimethylformamide solvent and furthermore reacting this resin with aminoacetamidoxime.

Chelate resin ⑪:
A resin obtained by reacting 1,2-benzisoxazole-3-acetamidoxime, resorcin and formalin.

Chelate resin ⑫:
A resin obtained by reacting 5-fluoro-1,2-benzisoxazole-3-acetamidoxime, phenol and formalin.

Chelate resin ⑬:
Commercially available chelate resin having amidoxime group [Duolite CS-346 (manufactured by Diamond Shamrock Corporation)].

Chelate resin ⑭:
A resin having Na salt of amidoxime group obtained by reacting acrylonitrile-tetraethyleneglycol dimethacrylate (1:0.2 in molar ratio) resin with hydroxylamine in the presence of toluene solvent and alkali-treating thus obtained resin with aqueous sodium hydroxide solution.

Chelate resin ⑮:
A resin obtained by reacting acrylonitrile-ethyleneglycol dimethacrylate (1:0.15 in molar ratio) resin with hydroxylamine in the presence of carbon tetrachloride solvent.

Chelate resin ⑯:
A resin obtained by reacting acrylonitrile-ethyleneglycol monomethacrylate (1:0.25 in molar ratio) resin with hydroxylamine in the presence of xylene solvent.

In the same manner as in Example 1, 100 cc of same aqueous sodium aluminate solution as used in Example 1 was passed through each of the above enumerated chelate resins over a period of 2 hours. The effluent was subjected to analysis on Ga and Al to obtain the results as shown in Table 2.

TABLE 2

| | | Kind of metal | |
|---|---|---|---|
| Example | Kind of resin | Concentration of Ga (ppm) | Concentration of Al (ppm) |
| 2 | Chelate resin ② | 17 | 41900 |
| 3 | Chelate resin ③ | 23 | 41950 |
| 4 | Chelate resin ④ | 22 | 41850 |
| 5 | Chelate resin ⑤ | 12 | 41950 |
| 6 | Chelate resin ⑥ | 9 | 41900 |
| 7 | Chelate resin ⑦ | 11 | 41970 |
| 8 | Chelate resin ⑧ | 14 | 41950 |
| 9 | Chelate resin ⑨ | 9 | 41990 |
| 10 | Chelate resin ⑩ | 26 | 41850 |
| 11 | Chelate resin ⑪ | 21 | 41950 |
| 12 | Chelate resin ⑫ | 19 | 41980 |
| 13 | Chelate resin ⑬ | 13 | 41850 |
| 14 | Chelate resin ⑭ | 10 | 41970 |
| 15 | Chelate resin ⑮ | 11 | 41960 |
| 16 | Chelate resin ⑯ | 10 | 41960 |

EXAMPLE 17

10 cc of chelate resin ① used in Example 1 was packed in a column of 12 m/mφ in inner diameter. 100 cc of the same aqueous sodium aluminate solution as used in Example 1 was introduced thereinto from the top of the column and passed therethrough over a period of 4 hours and then 50 cc of aqueous hydrochloric acid solution having a concentration of 10% by weight was pased therethrough over a period of 30 minutes. Furthermore, the resin was washed with 50 cc of water and thereafter aqueous sodium aluminate solution was passed therethrough in the same manner as the first time. Similarly, the third passing of aqueous sodium aluminate solution was effected. Concentrations of Ga and Al in the effluents were as shown in Table 3.

TABLE 3

| | Item | |
|---|---|---|
| Number of times | Concentration of Ga (ppm) | Concentration of Al (ppm) |
| The first time | 4 | 41950 |
| The second time | 7 | 42000 |
| The third time | 4 | 41950 |

EXAMPLE 18

10 cc of a resin having =NOH group, —NH$_2$ group and —OH group obtained by reacting 2-aminomethylbenzaldoxime, resorcin and formalin (called chelate resin 17) was packed in a column of 12 m/m$\phi$ in inner diameter, through which was passed over a period of 2 hours 100 cc of aqueous sodium aluminate solution from production of alumina by Bayer process containing 189 ppm of Ga, 42,000 ppm of Al and 123,800 ppm of Na introduced from the top of the column. The effluent was subjected to analysis on Ga and Al to obtain the results as shown in Table 4.

TABLE 4

| | Kind of metal | |
|---|---|---|
| Item | Ga | Al |
| Concentration of metal (ppm) | 37 | 40,850 |
| Adsorption recovery (%) | 80 | 2.7 |

EXAMPLES 19-30

Chelate resin ⑱:
A resin having =NOH group, —NHOH group, ≥N group and —OH group obtained by reacting 1,2-benzisoxazole-3-acetohydroxamoxime, resorcin and formalin.

Chelate resin ⑲:
A resin having =NOH group, —NHOH group, ≥N group and —OH group obtained by reacting 5-fluoro-1,2-benzisoxazole-3-acetohydroxamoxime, phenol and formalin.

Chelate resin ⑳:
A resin having =NOH group and Na salt of —CS$_2$H group obtained by reacting vinylamidoxime-divinylbenzene copolymer with carbon disulfide and then alkali-treating the reaction product with aqueous sodium hydroxide solution.

Chelate resin ㉑:
A resin having =NOH group and Ca salt of —COOH group obtained by reacting a condensation polymerization resin by benzoylimino-ethanediamidodioxime, aniline and formalin with monochloroacetic acid and then alkali-treating the reaction product with aqueous calcium hydroxide solution.

Chelate resin ㉒:
A resin having =NOH group, —NH$_2$ group, ≥N group and —OH group obtained by reacting 1,2-benzisoxazole-3-acetohydroxamic acid, 3-aminopyridine, resorcin and formalin.

Chelate resin ㉓:
A resin having =NOH group and ≥N group obtained by reacting 8-formylquinoline, benzaldehyde and formalin to make resinification and then reacting the resin with hydroxylamine.

Chelate resin ㉔:
A resin having =NOH group and —OH group obtained by reacting 2-hydroxybenzaldoxime, resorcin and formalin.

Chelate resin ㉕:
A resin having =NOH group and >NH group obtained by reacting 2-(N-methylaminoethyl)benzaldoxime, N-methylaniline and formalin.

Chelate resin ㉖:
A resin having =NOH group and >C=O group obtained by reacting 2-formylbenzaldoxime, benzyloxime and formalin.

Chelate resin ㉗:
A resin having three =NOH groups per unit resin obtained by reacting benzyldioxime, benzaldoxime and formalin.

Chelate resin ㉘:
A resin having =NOH group, —NH$_2$ group and —NHNH$_2$ group obtained by reacting acrylonitrile-divinylbenzene copolymer with hydroxylamine sulfate and aqueous hydrazine solution.

Chelate resin ㉙:
A resin having =NOH group, —NH$_2$ group and —NHCH$_2$CH$_2$NHCH$_2$CH$_2$NH$_2$ group obtained by reacting acrylonitrile-divinylbenzene copolymer with hydroxylamine hydrochloride and aqueous diethylene triamine solution.

In the same manner as in Example 1, 100 cc of same aqueous sodium aluminate solution as used in Example 1 was passed through each of the above enumerated chelate resins over a period of 2 hours and analysis was effected on Ga and Al in the effluents to obtain the results as shown in Table 5.

TABLE 5

| | | | Kind of metal | |
|---|---|---|---|---|
| Example | Kind of resin | Main functional groups of resin | Concentration of Ga (ppm) | Concentration of Al (ppm) |
| 19 | Chelate resin ⑱ | =NOH, —NHOH, —OH | 49 | 41,950 |
| 20 | Chelate resin ⑲ | =NOH, —NHOH, —OH | 37 | 41,900 |
| 21 | Chelate resin ⑳ | =NOH, —CS$_2$H | 9 | 41,950 |

TABLE 5-continued

| Example | Kind of resin | Main functional groups of resin | Concentration of Ga (ppm) | Concentration of Al (ppm) |
|---|---|---|---|---|
| 22 | Chelate resin ㉑ | =NOH, —COOH, \NH/ | 19 | 41,940 |
| 23 | Chelate resin ㉒ | =NOH, —NH₂, \N, —OH/ | 39 | 41,950 |
| 24 | Chelate resin ㉓ | =NOH, \N/ | 31 | 41,970 |
| 25 | Chelate resin ㉔ | =NOH, —OH | 39 | 41,100 |
| 26 | Chelate resin ㉕ | =NOH, \NH/ | 34 | 41,950 |
| 27 | Chelate resin ㉖ | =NOH, \C=O/ | 37 | 41,000 |
| 28 | Chelate resin ㉗ | =NOH, =NOH | 41 | 40,850 |
| 29 | Chelate resin ㉘ | =NOH, —NH₂, —NHNH₂ | 1 | 41,960 |
| 30 | Chelate resin ㉙ | =NOH, —NH₂, —NHCH₂CH₂NHCH₂CH₂NH₂ | 3 | 41,965 |

EXAMPLES 31 and 32

10g of each of chelate resins 1 and 17 was added to 100 cc of the same aqueous sodium aluminate solution as used in Example 1 and they were shaken for 1 hour. Thereafter, each of the mixture was separated into chelate resin and aqueous layer and concentrations of Ga and Al which remained in the aqueous layer were analyzed to obtain the results as shown in Table 6.

COMPARATIVE EXAMPLES 1-3

In the same manner as in Example 31, adsorption of gallium was effected using polyacrylonitrile fibers used for synthesis of chelate resin 1 in Example 1, strongly basic ion exchange resin Duolite A-161 (manufactured by Diamond Shamrock Corporation) and dithiocarbamic acid type chelate resin Sumichelate Q-10 (manufactured by Sumitomo Chemical Company, Ltd.). The results are shown in Table 6.

COMPARATIVE EXAMPLE 4

To 100 cc of the same aqueous sodium aluminate solution as used in Example 1 was added a Ga extractant comprising 10 g of KELEX 100 (having the structural formula:

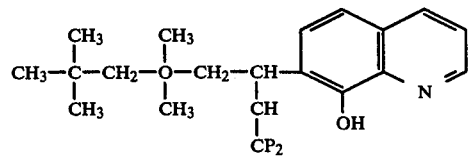

and manufactured by Ashland Chemical Company), 10 g of ndecanol and 80 g of kerosine and the mixture was shaken for 1 hour. Thereafter, this was separated into aqueous layer and oil layer and concentrations of Ga and Al which remained in the aqueous layer were analyzed. The results are shown in Table 6.

TABLE 6

| Example | Kind of chelating agent | Concentration of Ga (ppm) | Concentration of Al (ppm) |
|---|---|---|---|
| Example 31 | Chelate resin 1 | 8 | 41,960 |
| Example 32 | Chelate resin 17 | 31 | 41,960 |
| Comparative Example 1 | Polyacrylonitrile fiber | 184 | 41,970 |
| Comparative Example 2 | Duolite A-161 | 187 | 41,100 |
| Comparative Example 3 | Sumichelate Q-10 | 186 | 41,960 |
| Comparative Example 4 | KELEX 100 | 142 | 41,101 |

As shown in Examples 1-32 and Comparative Examples 1-4, the chelate resins used in this invention can selectively adsorb and remove Ga ions from strongly basic aqueous solutions such as aqueous sodium aluminate solutions from production of alumina by Bayer process and even from such solutions as containing coexisting ions in a large amount. Furthermore, they show no deterioration of chelating ability even after repeated use and thus are superior to the conventional chelating agents.

We claim:

1. A method for the selective recovery of gallium contained in a solution which comprises contacting a solution containing gallium with a chelate resin having, in the molecule, (A) a =NOH group and (B) a functional group capable of forming a chelate bond with said functional group (A) through gallium or a chelate resin having a metal salt of said functional group, said functional group (B) capable of forming a chelate bond with said functional group (A) through gallium being

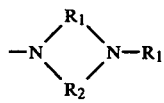

wherein $R_1$ and $R_2$ which may be identical or different represent hydrogen or organic group, $>N$, $-SH$, $=NOH$, $>C=O$, $-NHOH$, $-NH-NH_2$, $-CS_2H$, $-COOH$, $-SO_3H$, $>C=S$, $CHO$, $-S-$, $-P(OR)_2$, $-PO(OR)_2$ or $-PH(OR)_3$, where R which may be identical or different represents hydrogen, a phenyl group, an alkyl group, or an amino group, said method also including the steps of absorbing the gallium on the chelated resin and removing it from the solution.

2. A method for recovery of gallium according to claim 1 wherein the functional group (B) capable of forming a chelate bond with the functional group (A) through gallium is

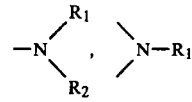

(wherein $R_1$ and $R_2$ which may be identical or different represent hydrogen or an organic group), $\geqslant N$, $-OH$, $-CS_2H$, $>C=O$ or $=NOH$.

3. A method for recovery of gallium according to claim 2 wherein said =NOH group (A) and said functional group (B) capable of forming a chelate bond with said functional group (A) through gallium bond to the same carbon atom in the molecule of the chelate resin.

4. A method of recovery of gallium according to claim 3 wherein the =NOH group (A) and the functional group (B) capable of forming a chelate bond with said functional group (A) through gallium are an amidoxime group.

5. A method for recovery of gallium according to claim 1 wherein said =NOH group (A) and said functional group (B) capable of forming a chelate bond with said functional group (A) through gallium bond to the same carbon atom in the molecule of the chelate resin.

6. A method for recovery of gallium according to claim 5 wherein the =NOH group (A) and the functional group (B) capable of forming a chelate bond with said functional group (A) through gallium are amidoxime group.

7. A method for recovery of gallium according to claim 1 wherein the solution containing gallium is a strongly basic aqueous solution.

8. A method for recovery of gallium according to claim 7 wherein the solution containing gallium is an aqueous sodium aluminate solution from production of alumina by Bayer process.

* * * * *

UNITED STATES PATENT AND TRADEMARK OFFICE
CERTIFICATE OF CORRECTION

PATENT NO. : 4,468,374
DATED : August 28, 1984
INVENTOR(S) : KATAOKA ET AL

It is certified that error appears in the above-identified patent and that said Letters Patent is hereby corrected as shown below:

In The Specification:

Column 2, lines 31-35, change the second formula to read:

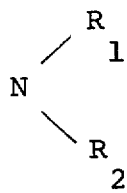

In The Claims:

Claim 1, rewrite the formula on column 11, line 20 as follows:

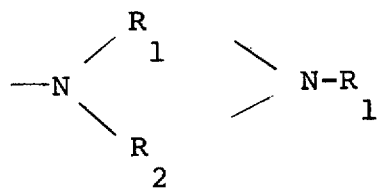

Signed and Sealed this

Nineteenth Day of March 1985

[SEAL]

Attest:

DONALD J. QUIGG

Attesting Officer     Acting Commissioner of Patents and Trademarks